July 1, 1930. C. P. SWEENY 1,769,868
TRANSMITTING AND RECEIVING SYSTEM
Filed March 17, 1926
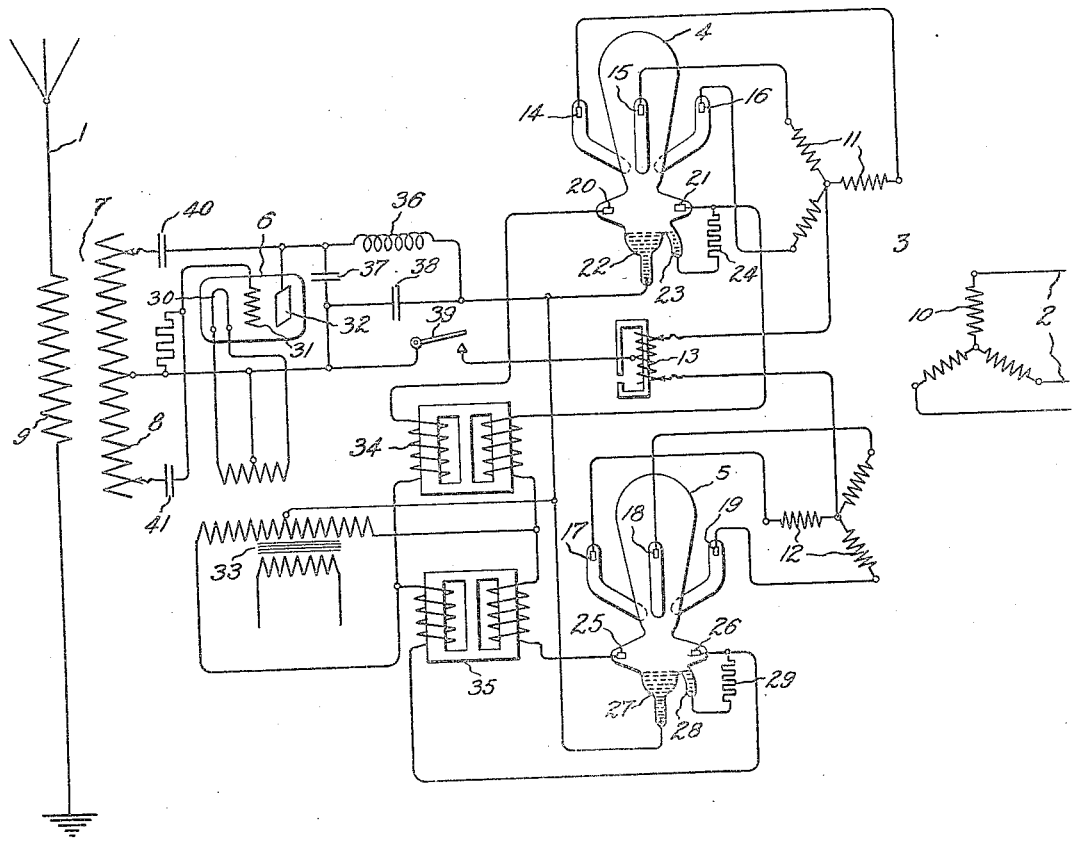
Inventor:
Carey P. Sweeny,
by
His Attorney.

Patented July 1, 1930

1,769,868

UNITED STATES PATENT OFFICE

CAREY P. SWEENY, OF ROCKY POINT, NEW YORK, ASSIGNOR TO GENERAL ELECTRIC COMPANY, A CORPORATION OF NEW YORK

TRANSMITTING AND RECEIVING SYSTEM

Application filed March 17, 1926. Serial No. 95,388.

My invention relates to systems for transmitting and receiving electrical impulses by radiotelegraphy or radiotelephony, and has for its principal object the provision of an improved transmitting and receiving apparatus which is operated efficiently and smoothly by energy supplied from an alternating current source.

In the transmission and reception of electric impulses by radiotelephony or radiotelegraphy, it is customary to utilize a thermionic device provided with a grid for controlling the transmission of current between its cathode and anode. Such a device operates most efficiently if its resistance is suddenly decreased at the beginning of the period during which it transmits current and is suddenly increased at the end of this period. In accordance with my invention, this result is produced through means comprising a vapor electric rectifier interposed between the thermionic device and an alternating current source from which this device is supplied with current. My invention will better be understood from the following description when considered in connection with the accompanying drawing and its scope will be pointed out in the appended claims.

The drawing is a diagrammatic showing of a transmitting apparatus wherein my invention has been embodied.

This apparatus comprises a circuit to be energized, shown as an antenna 1, and an alternating supply circuit 2, which are interconnected through a polyphase transformer 3, mercury rectifiers 4 and 5, a thermionic device 6, and a transformer 7 which comprises a primary circuit 8 and a secondary circuit 9.

The transformer 3 is provided with a primary circuit 10 and with secondary circuits 11 and 12, which have their neutrals interconnected through an interphase transformer 13 and have their terminals connected respectively to the anodes 14, 15 and 16 of rectifier 4 and the anodes 17, 18 and 19 of rectifier 5. The rectifier 4 is provided with exciting electrodes 20 and 21, a mercury cathode 22, and a starting electrode 23 which is connected to the exciting electrode 21 through a resistor 24. The rectifier 5 is likewise provided with exciting electrodes 25 and 26, a mercury cathode 27 and a starting electrode 28 which is connected with the exciting electrode 26 through a resistor 29. The thermionic device 6 comprises a cathode 30, a grid 31 connected to the cathode 30 through a grid leak as shown, and an anode 32. The cathode 30 is heated by current supplied from a suitable source through a transformer 33, and the excitation of the rectifiers 4 and 5 is maintained by current supplied from this source through transformer 33 and smoothing reactors 34 and 35 connected between the mercury cathodes and the exciting electrodes of devices 4 and 5 in a manner well understood by those skilled in the art.

It will be observed that the mercury cathodes of the rectifiers 4 and 5 are connected to the anode 32 through a filter shown as comprising a series inductance 36 and shunt capacities 37 and 38; that the winding of the interphase transformer 13 is connected to the cathode 30 through circuit control means shown as a key 39; that the cathode 30 is connected to the transformer winding 8 at a point intermediate its ends; and that the anode 32 and grid 31 are connected to the ends of the winding 8 respectively through blocking condensers 40 and 41 which are provided for keeping the direct current out of the winding 8.

With these connections, the devices 4, 5 and 6 are maintained in a condition to transmit current by means of heating and exciting current supplied through the transformer 33 but no current is transmitted between the alternating circuit 2 and the antenna 1 while the key 39 is in its illustrated open position. Upon closure of the key 39, however, the direct current voltage of the rectifiers 4 and 5 is applied to the anode 32 and cathode 30 of the thermionic device 6, the resistance of this device is suddenly decreased to a comparatively low value due to the fact that as the rectified voltage which is substantially constant in value, is applied to the anode 32, a voltage is applied to the anode end of the winding 8 through condenser 40 and a corresponding voltage of like polarity is induced in the lower section of the winding and is applied to the grid 31 through the condenser 41 since these sections are connected in opposing relation with respect to each other. Thus with a positive potential applied to the anode, a positive instantaneous potential is applied to the grid, thereby decreasing the resistance of the device 6. Current is then efficiently transmitted through the device 6 and the primary circuit of the transformer 7. Likewise, when the key 39 is opened, the potential of the grid 31 is suddenly reversed, the resistance of the device 6 is suddenly increased to a comparatively high value and loss of power in the device 6 due to the transmission of current while its resistance is high is avoided.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States is:

1. The combination of a polyphase mercury arc rectifier having a plurality of anodes and a cathode, a thermionic device having a cathode, an anode and a grid for controlling the transmission of current between its cathode and anode, means for completing a circuit between the anodes and cathodes of said rectifier and said thermionic device, a transmitter circuit including the anode and cathode of said thermionic device, an antenna coupled with said circuit whereby said antenna is energized when said last named circuit is completed, and means operable to vary the potential of said grid in accordance with the energization of said antenna.

2. The combination with a radio transmitter embodying a thermionic device, of an anode supply means for said device including a polyphase transformer having a secondary circuit provided with a plurality of terminals including a neutral terminal, a mercury arc rectifier provided with a cathode and a plurality of anodes each connected with a different terminal of said secondary circuit, an anode supply circuit for said thermionic device arranged to be connected between the cathode of said rectifier and the neutral terminal of the transformer secondary, and means for closing and opening said connection to energize said circuit.

3. The combination with a radio transmitter embodying a thermionic device having an anode, a cathode and a control grid, of an anode supply means for said device including a polyphase transformer having a secondary circuit provided with a plurality of terminals including a neutral terminal, a mercury arc rectifier provided with a cathode and a plurality of anodes each connected with a different terminal of said secondary circuit, an anode supply circuit for said thermionic device arranged to be connected between the cathode of said rectifier and with the neutral terminal of the transformer secondary, means for closing and opening said connection to energize said circuit, and circuit means including an inductance connected with said anode, cathode and grid of the thermionic device operable to vary the potential of the grid in accordance with the energization of said anode supply circuit.

In witness whereof, I have hereunto set my hand this 13th day of March, 1926.

CAREY P. SWEENY.